(12) United States Patent
Simon et al.

(10) Patent No.: US 7,198,114 B2
(45) Date of Patent: Apr. 3, 2007

(54) TURF MAINTENANCE DEVICE FOR AERATION AND VERTICAL CUTTING OF SOIL

(75) Inventors: Shane D. Simon, Cascade, IA (US); Steve Leytem, Cascade, IA (US); Gary Knepper, Cascade, IA (US)

(73) Assignee: American-Iowa Manufacturing Inc., Cascade, IA (US)

( * ) Notice: Subject to any disclaimer, the term of this patent is extended or adjusted under 35 U.S.C. 154(b) by 0 days.

(21) Appl. No.: 11/379,120

(22) Filed: Apr. 18, 2006

(65) Prior Publication Data

US 2006/0191694 A1    Aug. 31, 2006

Related U.S. Application Data

(63) Continuation of application No. 10/939,743, filed on Sep. 13, 2004.

(51) Int. Cl.
*A01B 45/02* (2006.01)

(52) U.S. Cl. ........................................................ 172/22

(58) Field of Classification Search ............ 172/19–22, 172/42, 76, 123–125; 56/249, 289, 294, 56/16.7
See application file for complete search history.

(56) References Cited

U.S. PATENT DOCUMENTS

| | | | |
|---|---|---|---|
| 2,827,751 A | 3/1958 | Mascaro | |
| 3,247,812 A | 4/1966 | Luciano et al. | |
| 3,743,025 A | 7/1973 | Thatcher | |
| 3,777,460 A | 12/1973 | Mokros | |
| 3,945,176 A | 3/1976 | Vicendese et al. | |
| 3,993,143 A | 11/1976 | Moreland, Jr. | |
| 4,127,176 A | 11/1978 | Van Der Lely | |
| 4,658,909 A | 4/1987 | McDermott et al. | |
| 4,905,460 A | 3/1990 | Toman | |
| 5,353,881 A | 10/1994 | Lee et al. | |
| 5,375,541 A | 12/1994 | McGann | |
| 5,469,922 A | 11/1995 | Bjonge | |
| 5,988,290 A | 11/1999 | Banks | |
| 6,393,814 B1 | 5/2002 | Gorey | |
| 6,488,100 B2 | 12/2002 | Underhill | |
| 6,550,705 B2 | 4/2003 | Pfisterer | |
| 6,607,039 B2 | 8/2003 | Simon | |

FOREIGN PATENT DOCUMENTS

FR    2536948 A1 *    6/1984

\* cited by examiner

*Primary Examiner*—Victor Batson

(57) ABSTRACT

A turf maintenance device for the aeration and vertical cutting of soil, including a conventional aerator, a vertical cutting device mounted to the aerator, operatively connected to a power source such that the aerator and vertical cutting device may be operated independently and/or simultaneously.

5 Claims, 3 Drawing Sheets

TURF MAINTENANCE DEVICE FOR AERATION AND VERTICAL CUTTING OF SOIL

This application is a continuation of application Ser. No. 10/939,743 filed Sep. 13, 2004.

BACKGROUND OF THE INVENTION

The present invention relates to a turf maintenance device and, more specifically, a combination aerator and verticutting device.

Aerators are well known in the art. An example of a conventional aerator device is set forth in U.S. Pat. No. 4,658,909 to McDermott et al. and is incorporated by reference herein. Aerators typically include a plurality of tines operatively connected to a driveshaft and are independently powered or coupled to a power take-off shaft of a tractor or the like. As the driveshaft turns, the tines alternately puncture the surface of the ground and remove plugs or cores of soil, which helps to improve the quality of the turf covering the ground. Aerators are expensive and because of their function are limited in use to one to two applications per year.

Vertical cutting devices, often referred to as "verticutters" in the trade, also are well known. An example of a conventional verticutting device is set forth in U.S. Pat. No. 6,393,814 to Gorey. Verticutting devices typically include a plurality of blades radially connected to a driveshaft. As the driveshaft turns, the vertical blades make a series of small vertical cuts in the ground, cutting runners in the turf and removing thatch and other dead foliage from the surface. When attached to a mower, the verticutter can only penetrate the ground surface by ¼ inch because it is under powered when 1 inch is preferred.

Depending on the situation, there are times when aeration is preferred over verticutting and vice versa. Also, there are situations where it is desirable to use the verticutter to process cores removed by the aerator. Presently, there is no device that incorporates an aerator and a verticutter into a single unit. Therefore, one must continually switch back and forth between an aerator device and a verticutter, which is time consuming and creates inefficiencies. As such, there remains a need in the art for a device that can perform both aeration and vertical cutting.

It is therefore a principal object of this invention to provide a turf maintenance device that allows for both aeration and vertical cutting of the soil in a single device.

A further object of this invention is to provide a turf maintenance device that is more efficient.

Still a further object of this invention is to provide a verticutting device that can be adapted for use in conjunction with existing aerator devices.

These and other objects will be apparent to those skilled in the art.

BRIEF SUMMARY OF THE INVENTION

The present invention is directed towards a turf maintenance device for the aeration and vertical cutting of soil. The device includes a conventional aerator, a vertical cutting device mounted to the aerator, and a pulley assembly operatively mounted to a power source such that the aerator and vertical cutting device may be operated independently and/or simultaneously.

DESCRIPTION OF THE PREFERRED EMBODIMENTS OF THE INVENTION

Figure 1:
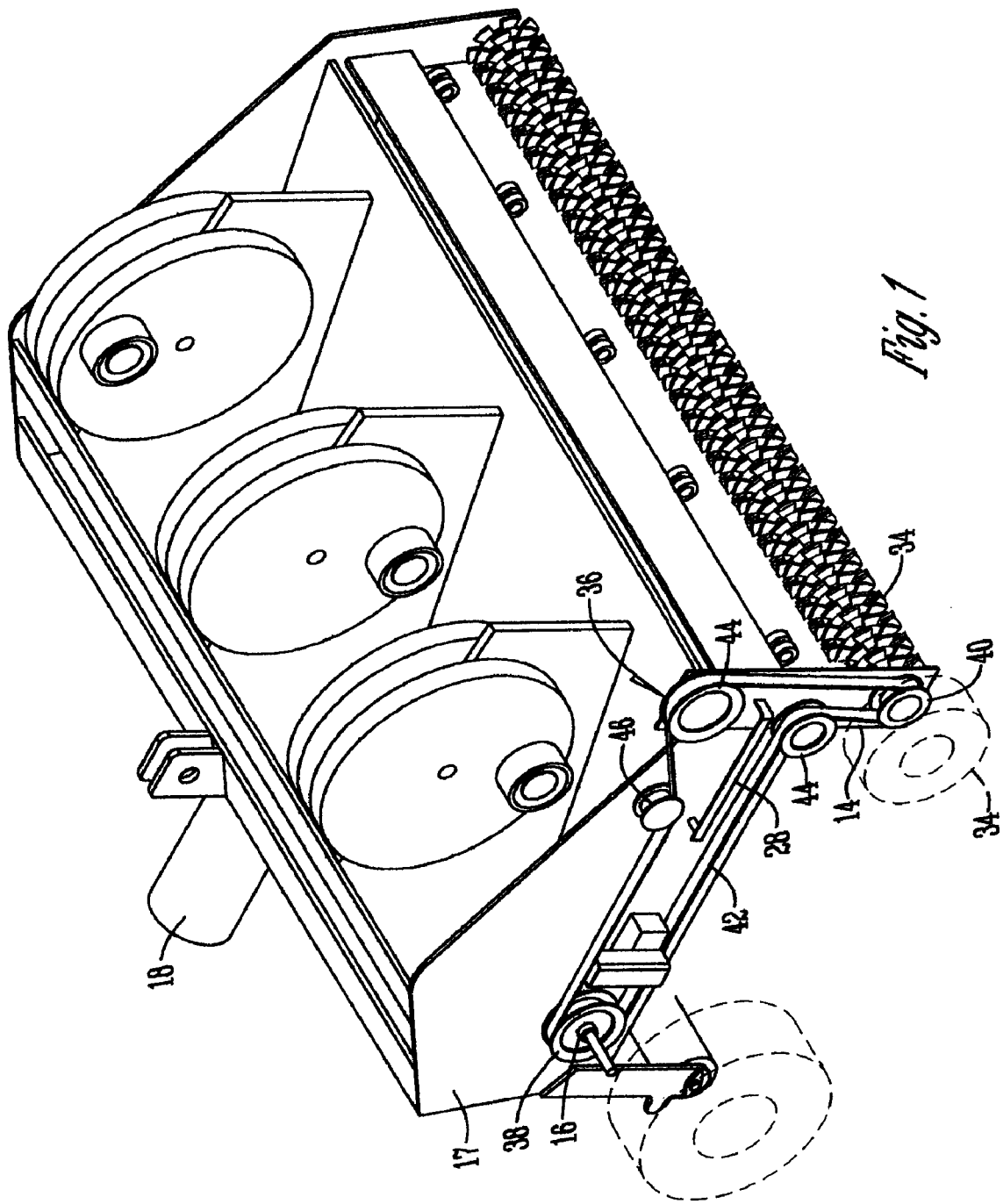
FIG. 1 is a perspective view of the combination aerator and verticutting device of the present invention.
Figure 2:
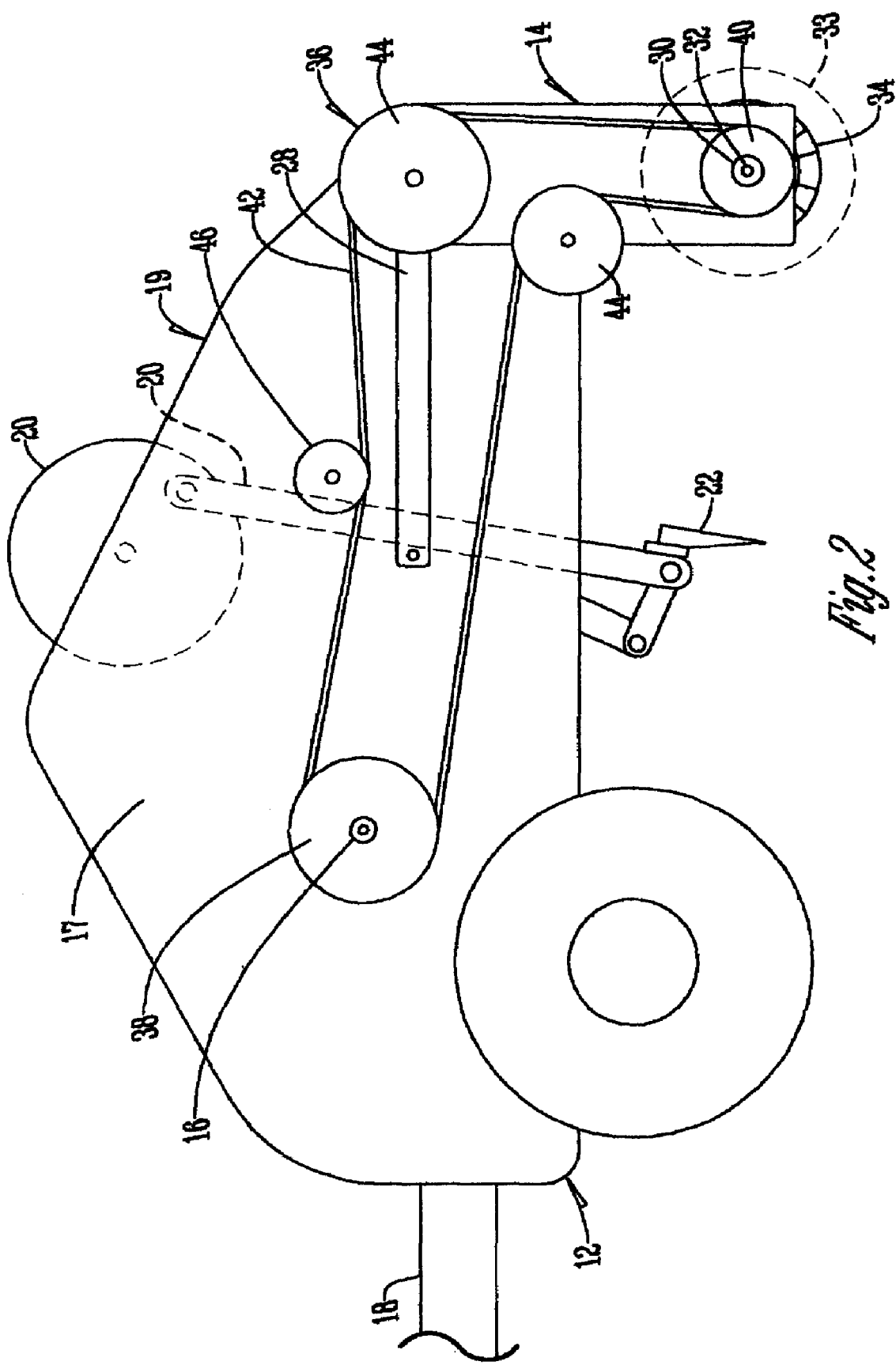
FIG. 2 is a side view of the present invention.
Figure 3:
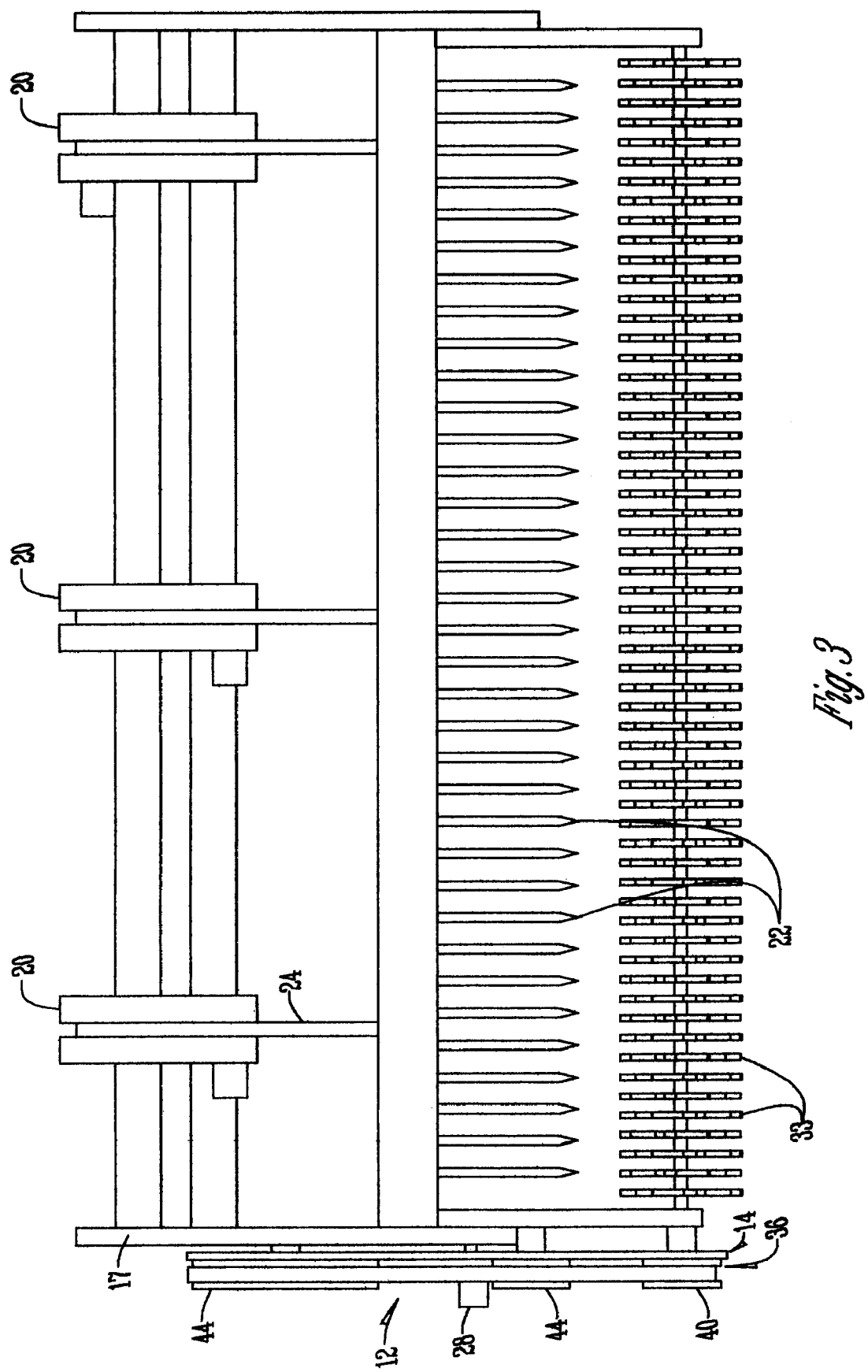
FIG. 3 is a top plan view of the present invention.

With reference to the figures, the device 10 of the present invention includes an aerator 12 with a vertical cutting unit or verticutter 14 mounted thereto.

The aerator 12 may be of any conventional design and is not in itself the focus of the present invention. The aerator 12 is designed to be pulled by a tractor and operatively connected to a power take-off shaft, or alternatively is a self-powered device such as the device disclosed by U.S. Pat. No. 5,988,290 to Banks, which is incorporated by reference herein. Generally, the aerator 12 has a driveshaft 16 that extends between the sidewalls 17 of a housing 19 and is operatively connected to a power source 18. Mounted on the drive shaft 16 are a plurality of flywheels 20 that are connected to a linkage assembly 24. The lower end of the linkage assembly carries a set of tines 22 such that as the flywheel 20 is rotated, the linkage assembly 24 is driven in a circular path while maintaining a substantially vertical orientation to drive the tines 22 in and out of the ground.

The vertical cutting device or verticutter 14 is mounted to the aerator 12. A pair of support arms 28 are connected to the outer surface of the sidewalls 17 of the aerator housing 19 and extend downwardly below the housing 12. The verticutter 14 includes a driveshaft 30 rotatably mounted to and extending between the arms 28. Radially disposed on the driveshaft 30 are a plurality of blades 34 that are positioned to make vertical cuts in the ground. To assist in supporting the verticutter 14 and prevent the verticutter from damaging the ground when traversing over an uneven area, a pair of wheels 33 are mounted to wheel mount 32.

A pulley assembly 36 operatively connects the verticutter 14 to the aerator 12. Specifically, drive pulleys 38 and 40 are secured to driveshafts 16 and 30, respectively. In an alternative embodiment, drive pulley 38 is secured to a drive shaft that is separate and apart from driveshaft 16 of aerator 12. A drive belt 42 connects drive pulleys 38 and 40 such that drive pulley 38, which is secured to and driven by driveshaft 16, drives pulley 40 and therefore driveshaft 30 via the drive belt 42. In this arrangement, power source 18 simultaneously drives the aerator 12 and the verticutter 14. Guide pulleys 44 are positioned about the housing 19 to direct the path of drive belt 42 and tension idler 46 maintains the appropriate amount of tension on the drive belt 42.

Alternatively, the flywheels 20 of the aerator 12 may be disengaged such that the verticutter 14 operates independently of the aerator 12. Likewise, when operatively connected to a drive shaft other than drive shaft 16, the verticutter 14 operates independently of the aerator 12.

In operation, power source 18, which is operatively connected to drive shaft 16, rotates flywheels 20 which raise and lower tines 22 to remove plugs from the ground. The verticutter 14 is raised off the ground via the pivoting of side arms 28. In this manner, the device 10 performs the conventional function of aerating the ground.

When desired, the flywheels 20 are disengaged such that they do not rotate in relation to drive shaft 16 and the verticutter 14 is lowered to engage the ground via the pivoting of side arms 28. In this situation, the power source 18 rotates drive shaft 16, which causes drive wheel 38 to operatively rotate drive wheel 40 through pulley assembly 36. Drive wheel 40 rotates drive shaft 30 to rotate blades 34 to make vertical cuts in the ground. Alternatively, the verticutting device is operatively connected to a drive shaft other than drive shaft 16 and is rotated in relation thereto. Through these methods, the verticutter 14 operates independently from the aerator 12 to perform the function of a verticutting device.

Finally, both the aerator 12 and the verticutter 14 are operated simultaneously either by drive shaft 16 or separate drive shafts. In this operation, the verticutter 14 is raised via pivoting of the side arms 28 to a position slightly off the ground such that as the aerator 12 pulls plugs or cores from the ground the cores engage the blades 34 of the verticutter 14. In this manner, the device performs the functions of aeration and core processing.

It is therefore seen that by the use of a verticutting device operatively connected to a conventional aerator, this invention permits both the aeration and vertical cutting of soil by a single device.

What is claimed is:

1. A turf maintenance device comprising:
   an aerator having a tubular tine wherein the tine is adapted to intermittently puncture ground such that in operation a powersource raises and lowers the tines to remove plugs from the ground; and
   a vertical cutting unit mounted to the aerator, the vertical cutting unit adapted to make a series of vertical cuts in the ground.

2. The device of claim 1 wherein the vertical cutting unit is operatively connected to the aerator.

3. The device of claim 2 wherein the vertical cutting unit is operatively connected to the aerator by a pulley assembly.

4. The device of claim 1 wherein the vertical cutting unit operates independently of the aerator.

5. The device of claim 1 wherein the vertical cutting unit is raised and lowered in relation to the aerator.

* * * * *